(12) United States Patent
Barr et al.

(10) Patent No.: US 6,657,816 B1
(45) Date of Patent: *Dec. 2, 2003

(54) THIN FILM INDUCTIVE READ/WRITE HEAD WITH A SLOPED POLE

(76) Inventors: Ronald A. Barr, 111 Whit's Rd., Mountain View, CA (US) 94040; Alguo Feng, 39475 Gallaudet Dr., #219, Fremont, CA (US) 94538

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/776,352

(22) Filed: Jan. 3, 2001

Related U.S. Application Data (63) Continuation of application No. 09/289,323, filed on Apr. 9, 1999, now abandoned.

(51) Int. Cl.[7] .................................................. G11B 5/147
(52) U.S. Cl. ........................................................ 360/126
(58) Field of Search ................................. 360/125, 126, 360/315, 317

(56) References Cited

U.S. PATENT DOCUMENTS

| | | | |
|---|---|---|---|
| 5,438,747 A | * | 8/1995 | Krounbi et al. ........ 204/192.34 |
| 5,473,491 A | * | 12/1995 | Fujisawa et al. |
| 5,805,391 A | * | 9/1998 | Chang et al. |
| 6,018,862 A | * | 2/2000 | Stageberg et al. .......... 360/126 |

* cited by examiner

*Primary Examiner*—George J. Letscher (57) ABSTRACT

A thin film read/write head with a high performance inductive write section that demonstrates good physical pole tip geometry control and is simple and economical to process. The head delineates an air bearing surface, and includes a pedestal formed on a read section. The pedestal includes a back edge that defines a zero throat level which lies in a plane substantially parallel to the air bearing surface. A pole layer is formed over, and separated from the pedestal to define a write gap therebetween. The pole layer includes an angled edge so that a top yoke can be stitched therealong to the pole layer.

40 Claims, 10 Drawing Sheets

THIN FILM INDUCTIVE READ/WRITE HEAD WITH A SLOPED POLE

CROSS-REFERENCE TO RELATED APPLICATIONS

The present application is a continuation application and claims the priority of copending U.S. patent application Ser. No. 09/289,323, Filed Apr. 9, 1999, abandonded titled "Thin Film Inductive Read/Write Head With Angled Pole" (as amended), and further relates to the following patent applications: Ser. No. 09/289,692, titled "Thin Film Head with Improved Yoke to Pole Stitch", and Ser. No. 09/289,701, titled "Thin Film Writer for High Density Applications and Method of Fabrication", both filed concurrently with the present application and assigned to the same assignee.

BACKGROUND OF THE INVENTION

1. Field of the Invention

The present invention relates in general to data storage systems such as disk drives, and it particularly relates to a thin film read/write head for use in such data storage systems. More specifically, the present invention relates to a thin film, inductive type write head with a stitched yoke, a curved apex region, and a top yoke geometry defined on a planar surface.

2. Description of Related Art

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

An exemplary magnetic head includes a thin film write head with a bottom pole (P1) and a top pole (P2). The poles P1 and P2 have a pole tip height dimension commonly referred to as "throat height". In a finished write head, the throat height is measured between an air bearing surface ("ABS"), formed by lapping and polishing the pole tip, and a zero throat level where the pole tip of the write head transitions to a back region. A pole tip region is defined as the region between the ABS and the zero throat level. Each of the poles P1 and P2 has a pole tip located in the pole tip region. The tip regions of the poles P1 and P2 are separated by a magnetic recording gap, which is a thin layer of insulation material.

A significant concern with the design of the magnetic head is to accurately control the dimensions of the top pole P2 in order to maximize the aerial density of the recording medium. This task has been particularly difficult to accomplish in view of the irregular topography of the inductive coil layer underlying the top pole P2. Such irregular topography is introduced during fabrication of the insulation layers that sandwich the coil structure and that flow into the pole tip region. As a result, when high moment material is sputter deposited on such uneven areas, soft spots develop and adversely affect the magnetic performance of the head.

In addition, it has been difficult to define the pole P2 with a tip less than 2 microns in width. This is because the width of the top pole P2 at the pole tip region is typically defined after placement of the coil structure, one or more insulation layers and the top pole layer. The width of the tip of pole P2 is defined by forming a thick photoresist mask on top of the pole P2 and then etching the width configuration at the pole tip region. The thickness of the resist layer has to be 20 microns or more in order to protect the pole P2 from ion bombardment. The thickness of the resist needs to be sufficient to either protect the pole piece during etching steps, or thick enough to "contain" the plated feature when pattern plating is used. Also, because of the topography of the device the resist tends to get much thicker than desirable in the region near the zero throat of the head, due to the dynamics of the resist coating process. The thicker the resist the more difficult it is to accurately control the dimensions of the resist, and it becomes very difficult to produce poles of less than 2 microns.

Another design concern with thin film write heads is the precise positioning of the zero throat level. Because of the difficulty in maintaining well defined frontal configurations of the top insulation layer and the top pole layer at the zero throat level, the zero throat level does not lie is a well defined plane which is parallel to the plane of the ABS. This problem is further exasperated by the dimensional changes that are effectuated by the curing process of the photoresist layers.

Still another design concern relates to the flux leakage between the two poles P1 and P2 at the back portion of the pole tip region, at, or in close proximity to the zero throat level. This is because the slope of the insulating layer in that area is gradual and the poles P1 and P2 are gradually or not sufficiently separated.

Attempts have been made to alleviate.the foregoing concerns. One such attempt is exemplified by U.S. Pat. No. 5,649,351 to Cole et al., which is incorporated herein by reference. The Cole et al. patent describes a thin film magnetic write head and method wherein the write head has a pole tip region between the planar ABS and the zero throat level. The write head has a yoke that includes top and bottom magnetic poles. Each pole has a pole tip structure in the pole tip region. The pole tip structure of the bottom pole has bottom and top pole tip elements PT1$a$ and PT1$b$ and the pole tip structure of the top pole has a top and bottom pole tip elements PT2$a$ and PT2$b$. The pole tip elements PT1$b$ and PT2$b$ are located between the pole tip elements PT1$a$ and PT2$a$ and a gap layer G is located between the pole tip elements PT1$b$ and PT2$b$. Each of the pole tip elements PT1$b$ and PT2$b$ and the gap layer G are bounded by front and back walls and first and second sidewalls. The first sidewalls of the pole tip elements PT1$b$ and PT2$b$ and the gap layer G are aligned with respect to one another and the second sidewalls of the pole tip elements PT1$b$ and PT2$b$ and the gap layer G are aligned with respect to one another. The front walls of the pole tip elements PT1$b$ and PT2$b$ and the gap layer G lie in a common plane which forms a portion of the ABS. The back walls of the pole tip elements PT1$b$ and PT2$b$ and the gap layer G lie in a common plane which forms the zero throat level. The common plane of the zero throat level is substantially parallel to the common plane of the ABS.

While the Wade et al. design may have addressed and resolved some of the foregoing design concerns, it is not completely satisfactory. Among other shortcomings, the back edge of the pole tip element PT2$b$ in the Wade et al. head defines the back edge of the gap G, such that the dimensions, i.e., the length and width of the pole tip element PT2$b$, have to be defined and formed simultaneously in a single step.

Furthermore, the pole tip element PT2a in the Wade et al. head is stitched to the pole tip element PT2b at the ABS level. If the stitch at the ABS were not adequate, it can create a secondary gap capable of writing and inducing noise onto the medium. Furthermore, the presence of a weakness in the stitch at the ABS might eventually lead to a physical separation of the two pole tip elements PT2a and PT2b, resulting in a fringe field that generates undesirable noise.

SUMMARY OF THE INVENTION

One aspect of the present invention is to satisfy the long felt, and still unsatisfied need for thin film read/write head with a high performance inductive write section that demonstrates good physical pole tip geometry control and is simple and economical to process.

The head delineates an air bearing surface, and includes a pedestal formed on a read section. The pedestal includes a back edge that defines a zero throat level which lies in a plane substantially parallel to the air bearing surface. A pole layer is formed over, and separated from the pedestal to define a write gap therebetween. The pole layer includes an angled edge so that a top yoke can be stitched therealong to the pole layer.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF THE INVENTION

Figure 1:
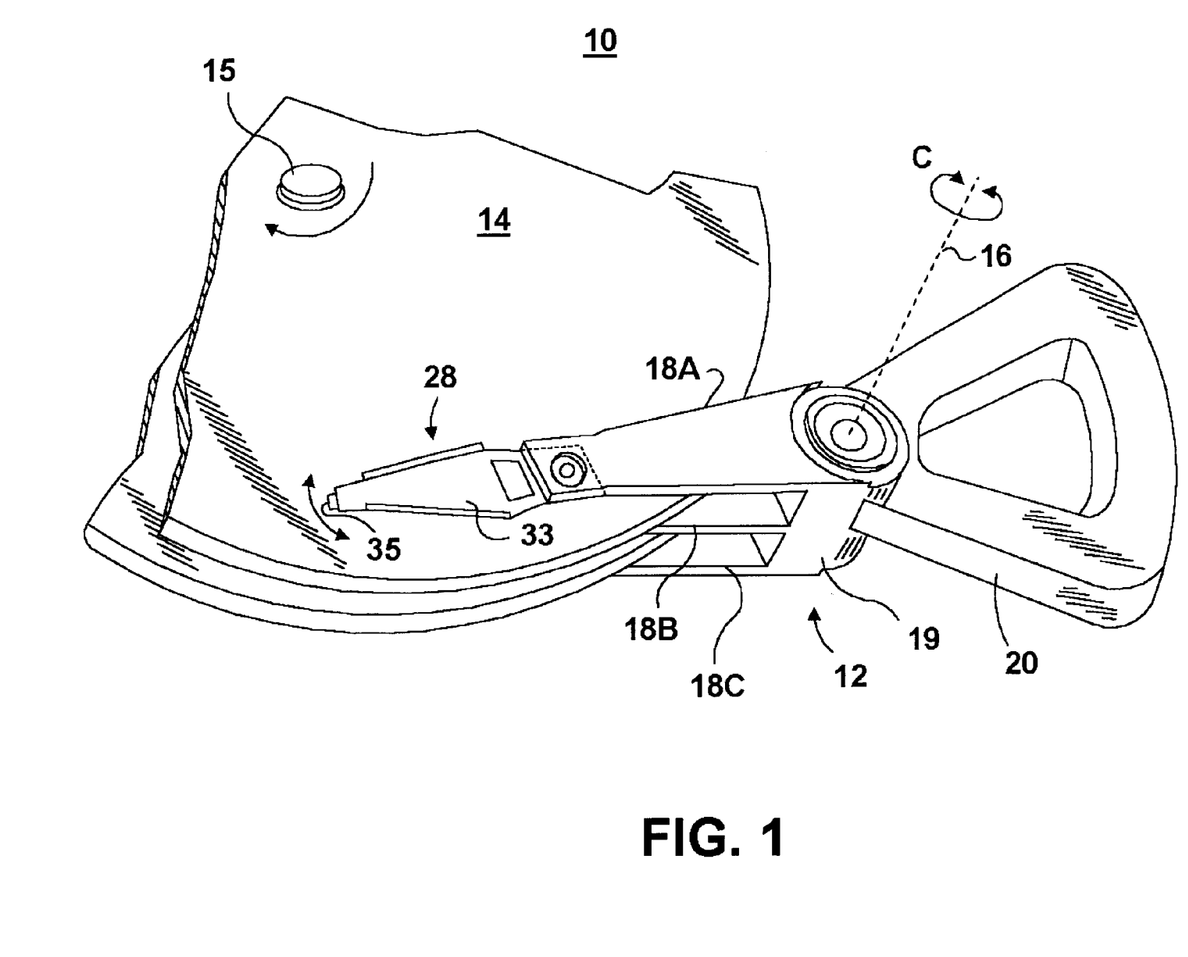
FIG. 1 is a fragmentary perspective view of a data storage system utilizing a read/write head according to the, invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
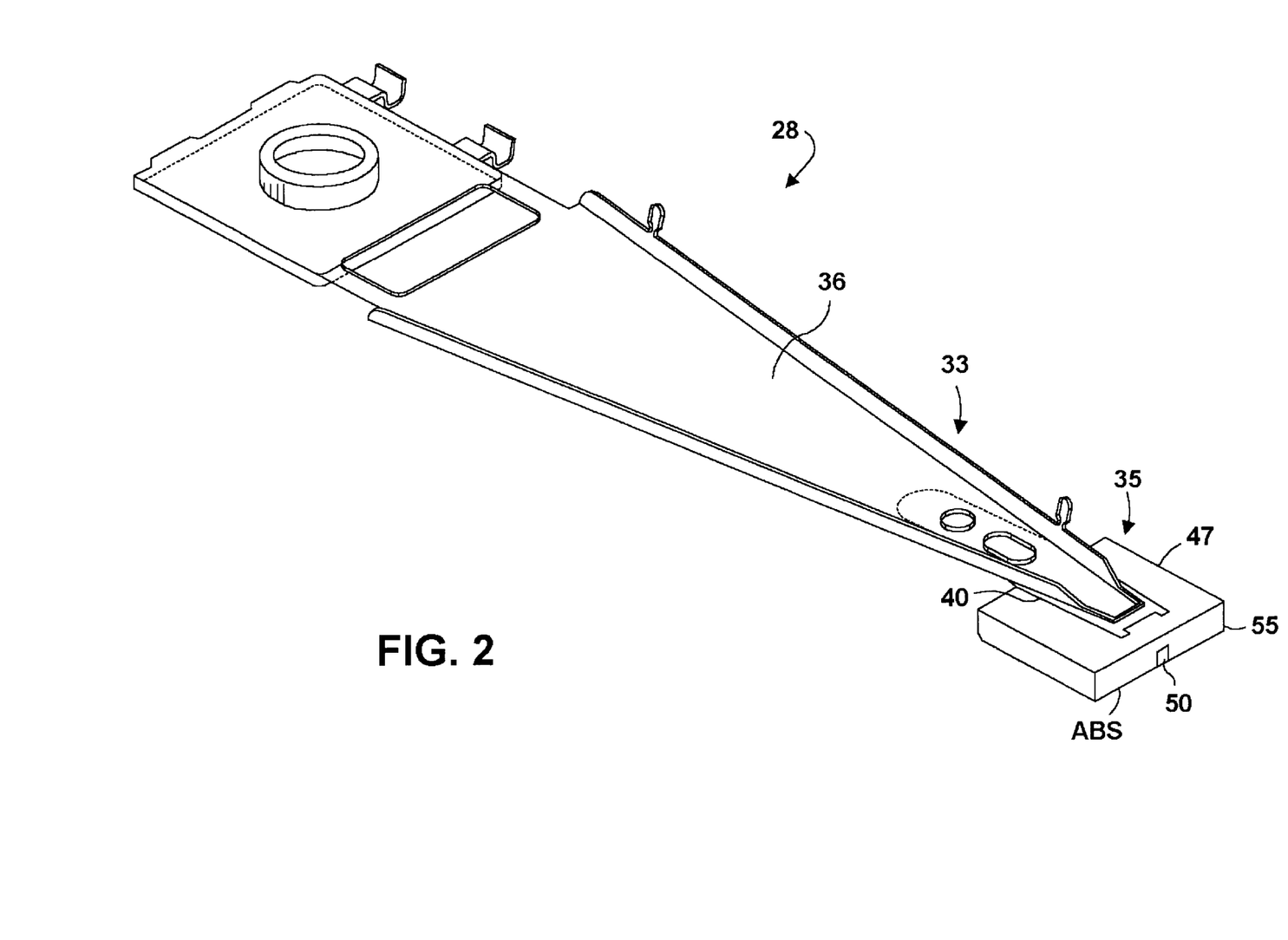
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. In the example illustrated in FIG. 2, the read/write element 50 is secured to the trailing edge 55 of the slider 47. The slider 47 can be any conventional or available slider.

Figure 3:
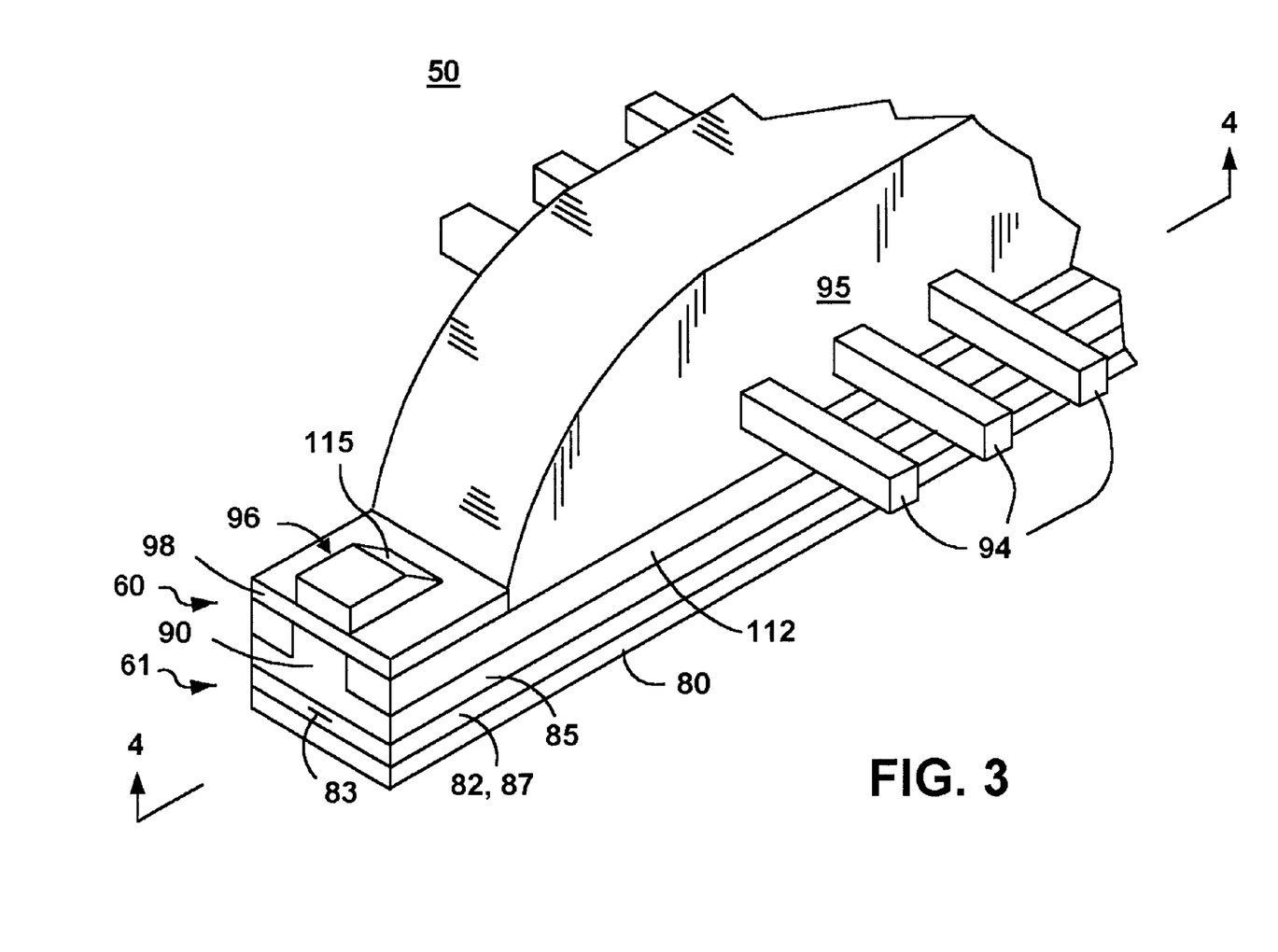
FIG. 3 is an enlarged perspective view of a thin film read/write element (with the top yoke removed for clarity of illustration) forming part of the read/write head of FIGS. 1 and 2, and made according to the present invention.
Figure 3A:
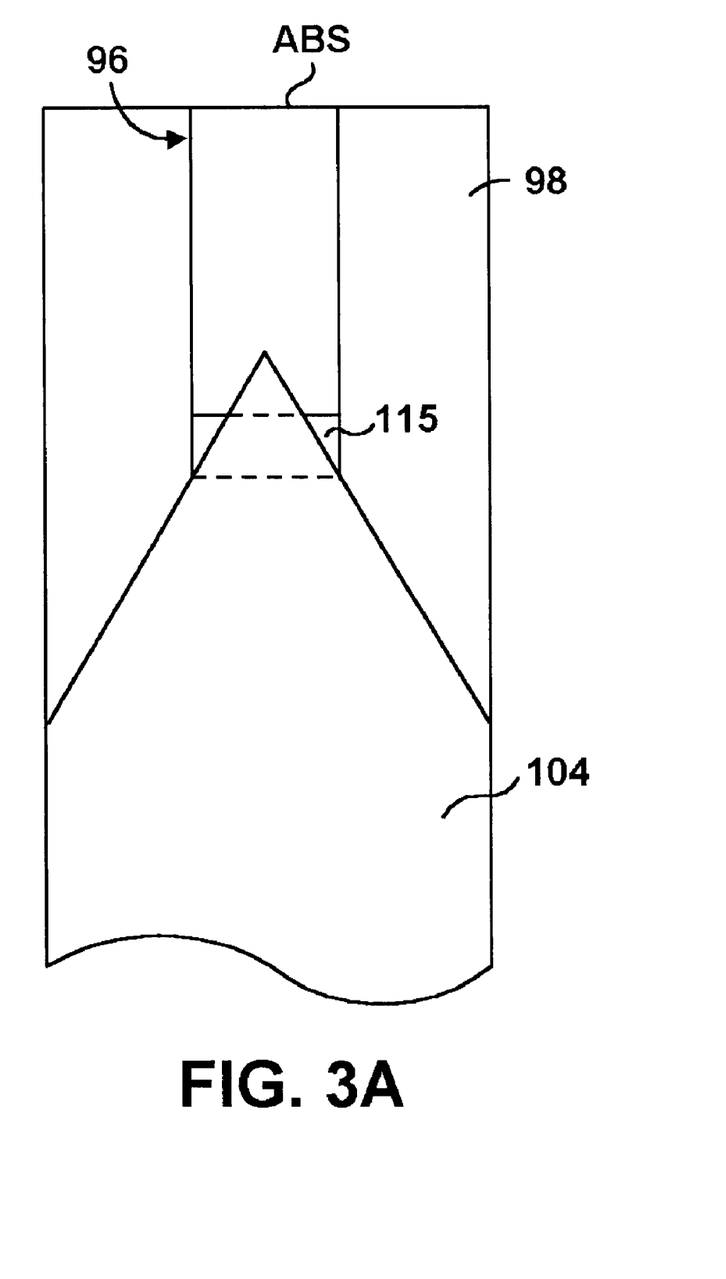
FIG. 3A is a partial top plan view of the read/write element of FIG. 3, showing the top yoke.
Figure 4:
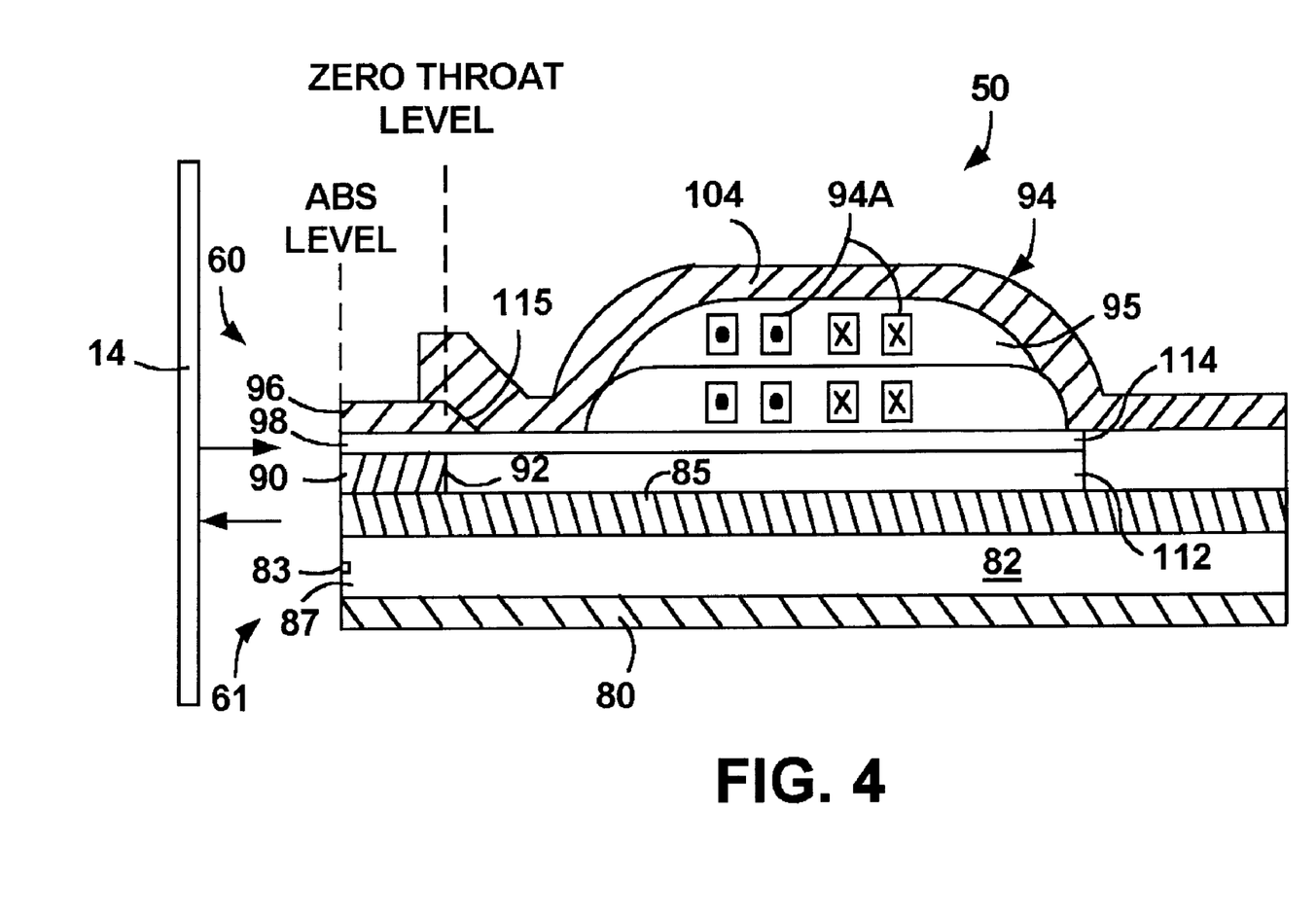
FIG. 4 is a cross-sectional view of the read/write element of FIG. 3 taken along line 4—4, and shown positioned relative to a data storage medium.
Figure 6:
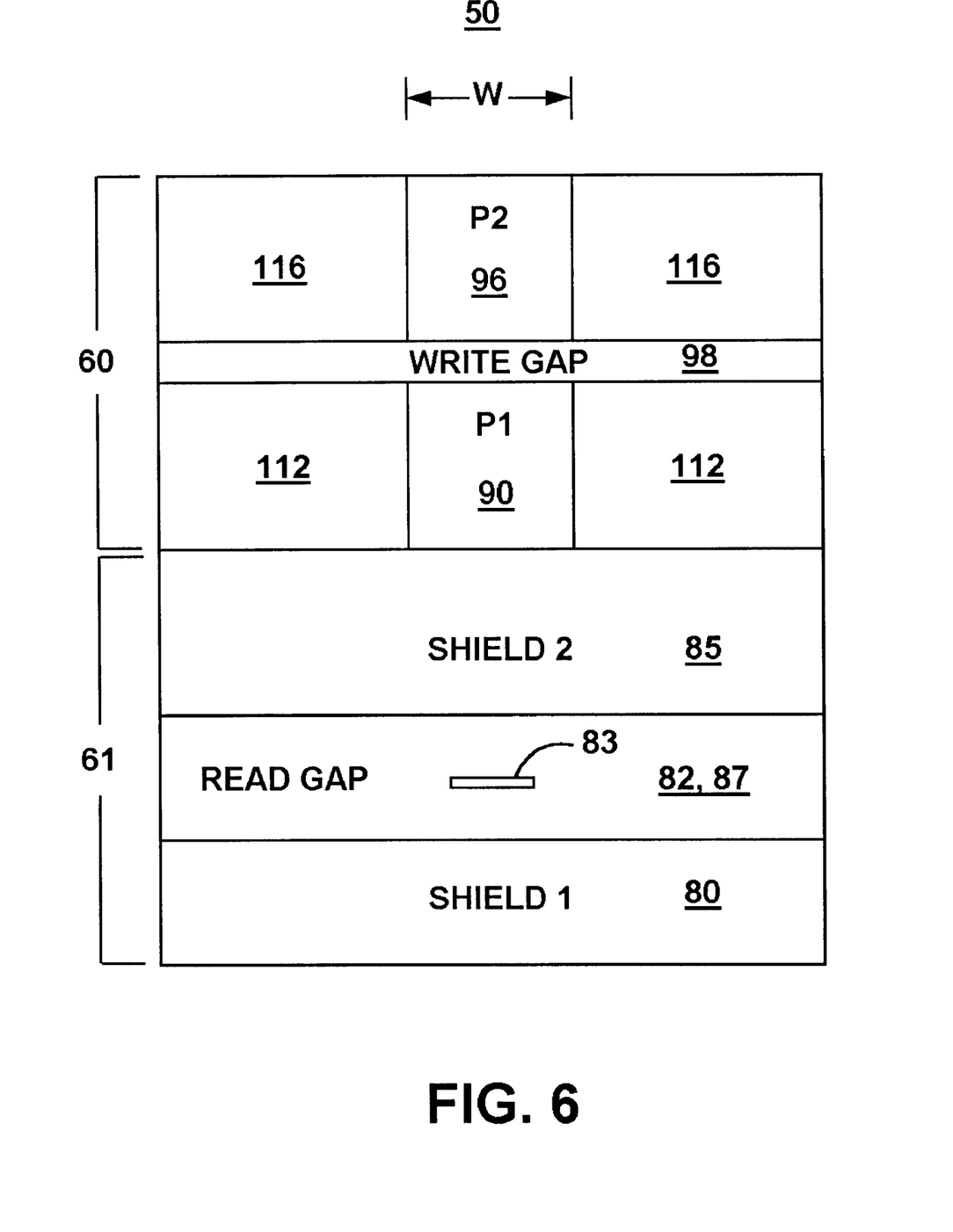
FIG. 6 is an ABS view of the read/write head of the present invention.

The details of the read/write element 50 will now be described with reference to FIGS. 3, 4, and 6. The read/write element 50 integrates a write section 60 and a read section 61. The read section 61 is formed of a first shield layer (Shield 1) 80 preferably made of a material that is both magnetically and electrically conductive. For example, the first shield layer 80 can have a nickel-iron (NiFe) composition, such as Permalloy, or a ferromagnetic composition with high permeability. The thickness of the first shield layer 80 can be in the range of approximately 0.5 micron to approximately 14 microns.

An insulating layer 82 is formed over substantially the entire surface of the first shield layer 80 to define a non-magnetic, transducing read gap 87. The insulation layer can be made of any suitable material, for example alumina ($Al_2O_3$), aluminum oxide or silicon nitride. The read section 61 is also comprised of a read sensor 83 formed within the insulation layer 82. The read sensor 83 can be any suitable sensor, including but not limited to a magnetoresistive (MR) element, a giant magnetoresistive (GMR) element, a spin valve, or a Current In the Plane mode (CIP) sensor.

If, for example, a GMR element were used, it can be formed, by way of example, by depositing a plurality of alternating ultra-thin layers of magnetically conductive and nonconductive materials such as Permalloy (Ni80 Fe20) and copper (Cu), each layer being approximately 10 to 30 angstroms thick. The electric resistance of the GMR element 83 fluctuates when exposed to a time-varying magnetic flux. Unlike inductive transducers, a magnetoresistive element is sensitive to the magnitude of a flux transition rather than to the rate of change of the flux transition. This gives the magnetoresistive element 83 certain advantages over inductive transducers, such as insensitivity to disk speed changes. The overall thickness of the GMR element 83 can be in the range of approximately 30 angstroms to approximately 3000 angstroms.

The read section 61 is also comprised of a second shield layer (Shield 2) 85 that is made of an electrically and magnetically conductive material, Which may be similar or equivalent to that of the first shield layer 80. The second shield layer 85 is formed over substantially the entire surface of the insulating layer 82, and has a thickness that can be substantially similar or equivalent to that of the first shield layer 80.

A read circuit 102 (not shown) is connected to the first shield layer 80 and the second shield layer 85, such that during a read mode the read circuit sends a sensing electric current $I_R$ through the sensor 83 and the second shield layer 85. The read-sense current $I_R$ flows perpendicularly through the sensor 83, thus avoiding the along-the plane electromigration problems and magnetic-biasing due to parallel-current problems associated with earlier designs based on CIP operation (Current In the Plane mode). Reference is made to U.S. Pat. Nos. 5,576,914 and 5,446,613 that are incorporated herein by reference, and which describe the operation of a magnetic read/write head.

The write section 60 is comprised of a first pole layer or pedestal P1 (also referenced by the numeral 90) that extends, for example, integrally from the second shield layer 85. The steps of forming the write section 60 will be explained later in connection with FIGS. 5A through 5G. The pedestal P1 includes a back edge 92 that defines the zero throat level with extreme accuracy. In a preferred embodiment, the pedestal P1 extends only to the zero throat 92.

A write coil 94 include a plurality of multi-layered conductive coil elements (or conductors) 94A, only a few of which are illustrated also form part of the write section 60. The coil elements 94A are formed within an insulating layer 95. The write coil 94 can have two, four or more turns as required, to generate the desired write field.

A second pole layer 96 is made of a: magnetically conductive material, and be for example only, similar or equivalent to that of the first shield layer 80 and the first pole layer 85. The second pole layer 96 is formed over, and is separated from the pedestal 90, to define a write gap 98 therewith. The thickness of the second pole layer 96 can be substantially the same as, or similar to that of the first shield layer 80. The write gap 98 can be filled with a material similar or equivalent to that of the insulating layer 82. With reference to FIG. 4, the second pole layer 96 includes an angled back (or sloped) edge 115 along which the second pole layer 96 is stitched to a top (or upper) yoke 104.

A write circuit 100 (not shown) is connected to the write coil 94, and, during a write mode, it sends an electrical current $I_w$ to induce a flux flow through the write gap 98. Changes in the flux flow across the write gap 98 produce the different magnetic orientations of vertical magnetized regions or domains in the disk 14 during a write operation.

With reference to FIG. 2, the read/write element 50 is mounted at the trailing edge 55 of the slider 47 so that its forward most tip is generally flush with the ABS of the slider 47. In another embodiment according to the present invention more than one read/write element 50 can be secured to the trailing edge 55 or other side(s) of the slider 47.

Figure 5A:
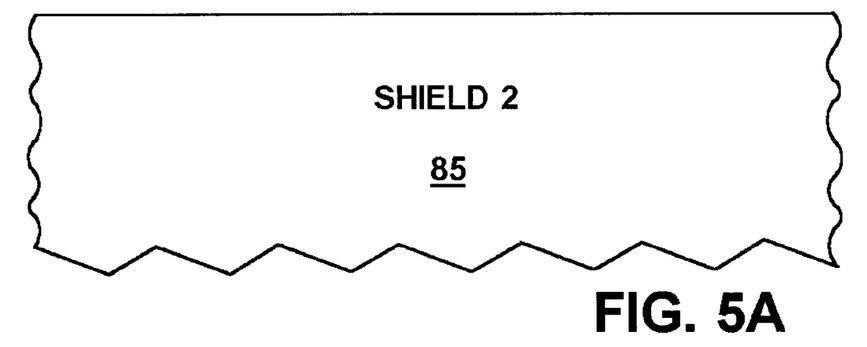
FIGS. 5A through 5G are schematic, side view illustrations of a sequence of steps involved in the fabrication of the thin film read/write of FIGS. 3–4.
Figure 5B:
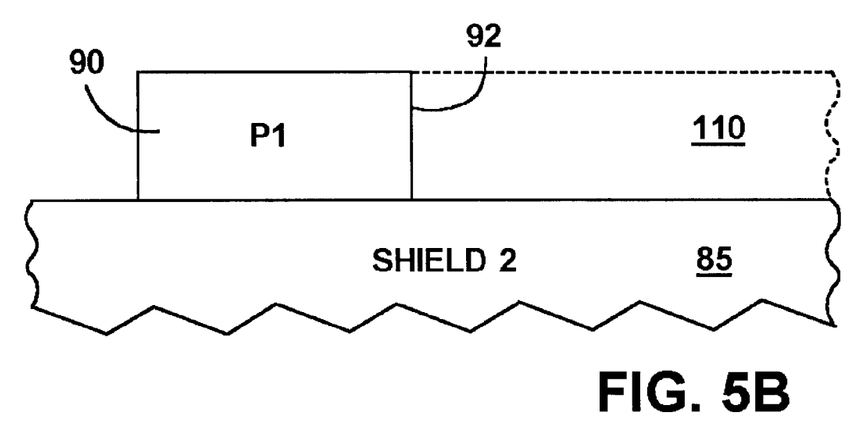

The fabrication steps of the write section 60 will now be described in relation to FIGS. 5A–5G. With reference to FIG. 5A, the second shield layer 85 is formed using known or available thin film deposition techniques. The next step is illustrated in FIG. 5B, where a portion 110 (shown in dotted lines) of the second shield layer 85, is milled away to form the pedestal P1, and to define the back edge 92 with great precision. Alternatively, the pedestal P1 can be formed using pattern plating techniques, which would also form the zero throat level with great precision.

The back edge 92 defines the zero throat level of the read/write head 35. The zero throat level lies in a well defined plane that is generally parallel to the plane of the ABS level, which, in turn, is co-planar with the forward edge of the pedestal P1. The pole tip region of the read/write head 35 is defined as the region between the zero throat level and the ABS level. Another important feature of the present design is the positioning of the zero throat level distally from the ABS, as a result of which a defect in the back edge 92 will not affect the head performance.

Figure 5C:
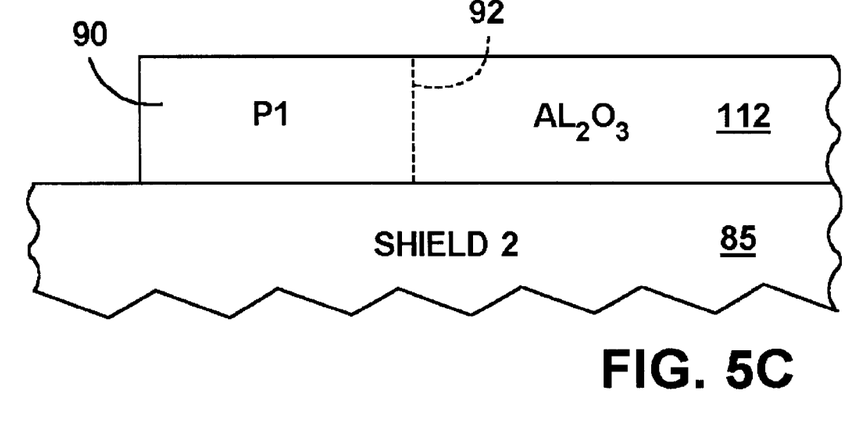

With reference to FIG. 5C, an insulating layer 112 is deposited on the second shield layer 85, within the region 110 that has been milled away to define the pedestal P1 (FIG. 5B). Alternatively, the insulating layer 112 can be formed using pattern plating techniques. The insulating layer 112 is then lapped to the same height as that of the pedestal P1. While in FIG. 5C, the back edge 92 of the pedestal P1 is shown in dotted lines as it is actually covered by the insulating layer 112, the back edge 92 will be represented by a solid line in subsequent FIGS. 5D through 5G for the purpose of clarity.

Figure 5D:
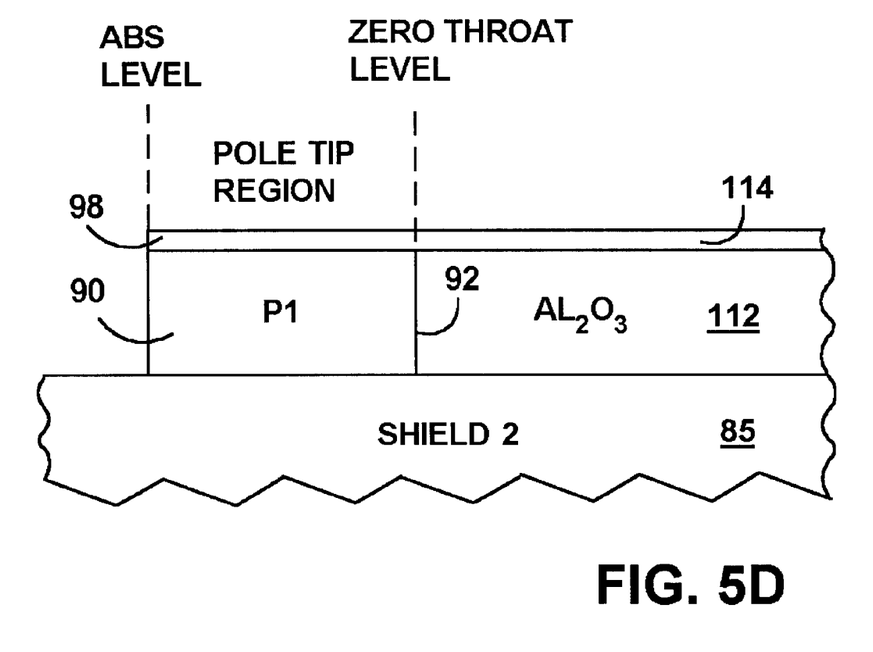

The next fabrication step is illustrated in FIG. 5D, wherein the write gap 98 is formed by depositing a thin, uniform, insulating layer 114 that separates the pedestal P1 from the top pole P2 (96). The insulating layer covers substantially the entire surface of the pedestal P1 and the insulating layer 112. The thickness of the insulating layer ranges between approximately 100 Angstroms and 10000 Angstroms, with the preferred range being 500 Angstroms and 2000 Angstroms.

Figure 5E:
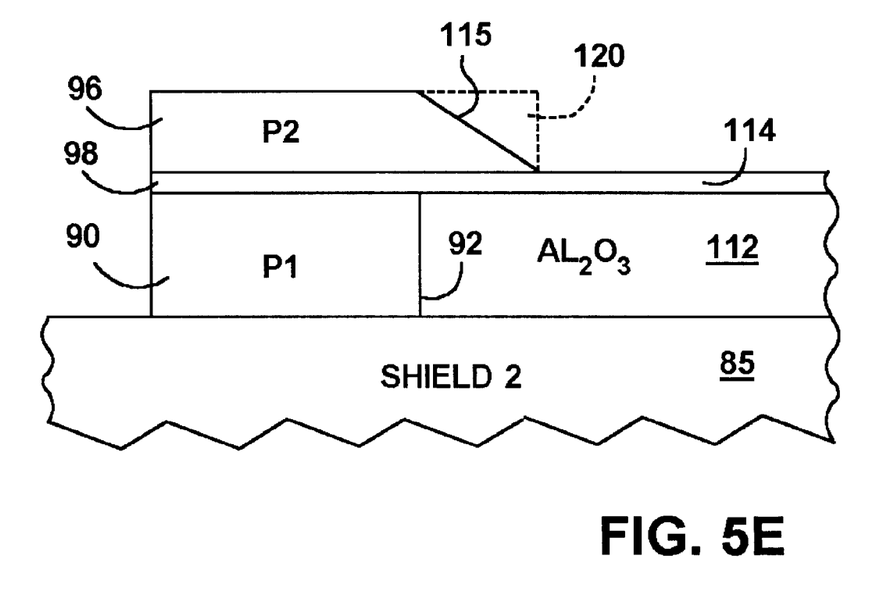

With reference to FIG. 5E, the top pole P2 (96) is formed by depositing a film of magnetic material by means of known or available techniques, such as sputter deposition and etching, or pattern plating. With further reference to FIG. 6, the width of the top pole P2 is initially much smaller than the width of the pedestal P1. After the top pole P2 is formed, it is etched or milled (using available or known techniques) such that the pattern of the top pole P2 is etched into the pedestal P1. This results in the top pole P2 and the pedestal P1 having essentially the same width "W", thus providing self aligned, optimal control of the data track width, and improving the head performance and aerial density.

The present design offers an important advantage, namely the existence of an abrupt transition between the second shield layer P2 and the zero throat level resulting from the fact that the edge 92 of the pedestal P1, which forms the zero throat, is at a 90-degree angle with reference to the write gap 98, as opposed to the conventional gradual transition. This feature improves the head efficiency and performance, as leakage losses within the head are minimized and the magnetic flux is optimized.

Next, an angled edge 115 is formed in the top pole P2 by milling away a portion 120 (shown in dotted lines). The angled edge 115 serves as a stitching surface for the yoke 104 which will be formed in a later step (FIG. 5G). The write coil comprised of the conductors 94 and the insulating layers 95, is then formed on the write gap 98, at a distance from the second pole layer P2, such that a clearance 125 (FIG. 5F) is created between the angled stitching edge 115 and a forward most edge 126 of the insulating layers 95. In a preferred embodiment, the clearance 125 is minimized, such that the forward most edge 126 of the insulating layers 95 would be as close to angled stitching edge 115 as engineering tolerance would allow. A protective, insulating layer can be patterned around the top pole 96, and extends from the ABS level to cover the entire device, in order to completely encapsulate it.

Figure 5F:
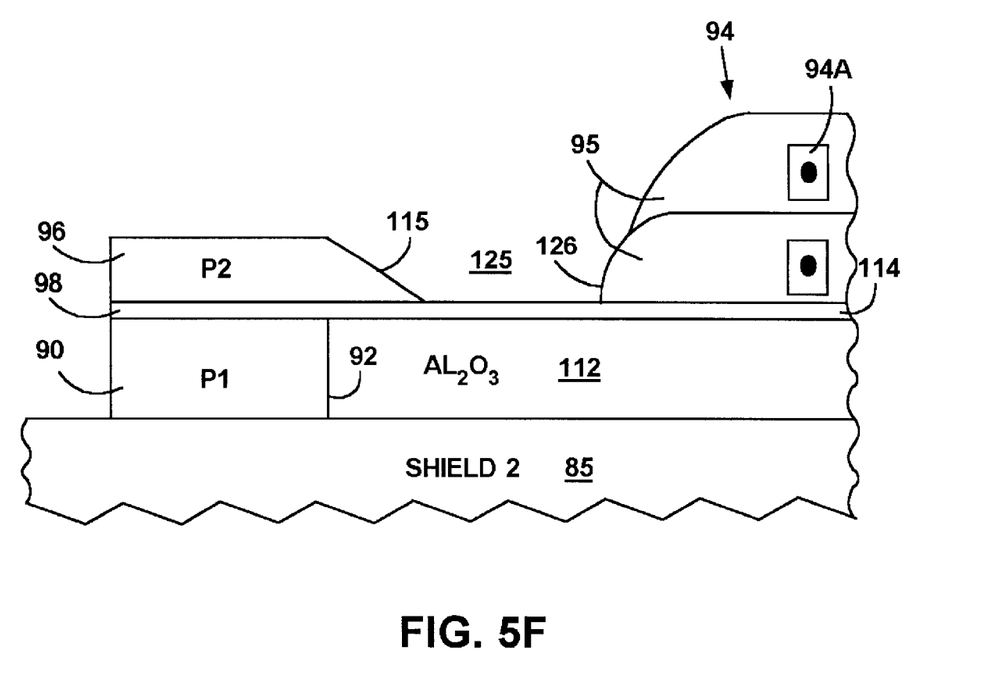
Figure 5G:
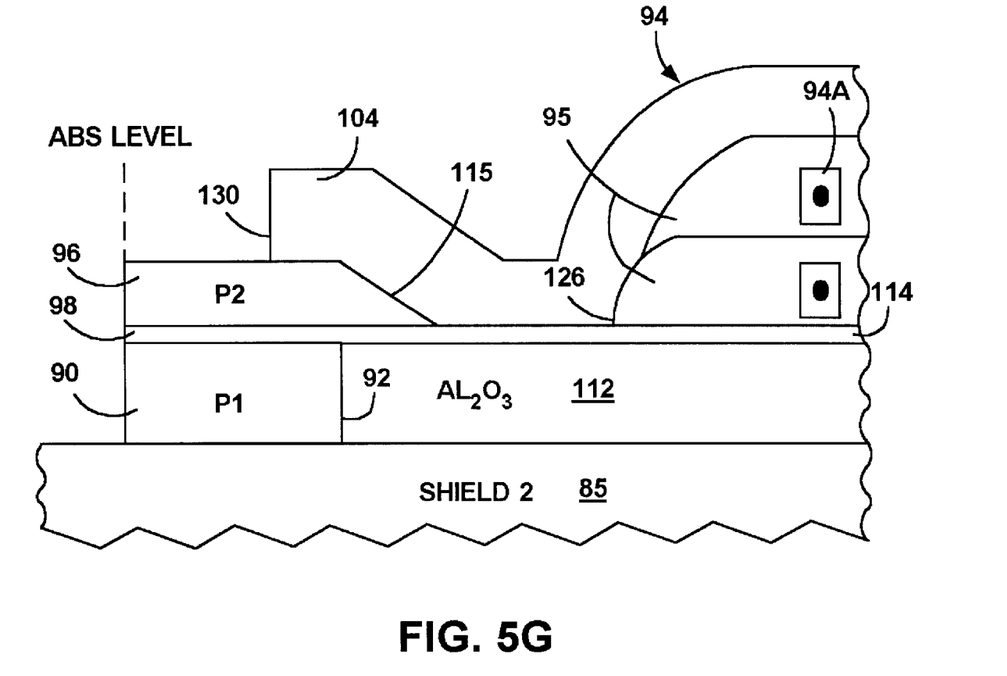

As shown in FIG. 5G, the top yoke 104 is then formed on the structure of FIG. 5F. The top yoke 104 partially covers, and is stitched to the second pole P2 along the angled edge 15. The top yoke 104 extends within the clearance 125, and covers the insulating layer 95 of the write coil 94. A forward most facet 130 of the top yoke 104 is recessed relative to the ABS level in order to keep the to yoke 104 from writing on the medium 14.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A thin film head including a write section and defining an air bearing surface, the head, comprising:

a first pole layer;

a pedestal having a back edge that defines a zero throat level, the zero throat level lying in a plane substantially parallel to the air bearing surface and substantially normal to the first pole layer;

a second pole layer formed over, and separated from the pedestal for defining a write gap therebetween;

a top yoke covering at least in part, and stitched to the second pole layer;

wherein the second pole layer includes a sloped rearward edge;

wherein the top yoke is stitched at least in part along the sloped rearward edge; and wherein the top yoke includes a forward most facet which is recessed relative to the air bearing surface.

2. A thin film head according to claim 1, wherein the write gap is filled with insulating material.

3. A thin film head according to claim 1, wherein the pedestal extends from the air bearing surface to the zero throat level.

4. A thin film head according to claim 1, further including a read section.

5. A thin film head according to claim 4, wherein the read section includes a first shield layer and a second shield layer; and wherein the pedestal extends integrally from a second shield layer.

6. A thin film head according to claim 1, further including a write coil formed of multi-layered conductive coil elements that are separated by an insulating layer.

7. A thin film head according to claim 6, wherein the read section includes any of: a magnetoresistive (MR) element, a giant magnetoresistive (GMR) element, a spin valve, or a Current In the Plane mode (CIP) sensor.

8. The thin film head according to claim 7, wherein the insulating layer is separated from the sloped rearward edge by a clearance.

9. A thin film head according to claim 1, wherein the pedestal and the second pole layer have substantially the same width, as viewed from the air bearing surface.

10. A thin film according to claim 9, wherein the width of the pedestal and the second pole layer defines a track width of a medium.

11. The thin film head according to claim 1, wherein the sloped rearward edge begins to slope at substantially the plane of the zero throat level.

12. A head gimbal assembly, comprising:

a suspension;

a slider;

a thin film head secured to the suspension, and defining an air bearing surface and a write section;

a first pole layer;

the write section including:

a pedestal having a back edge that defines a zero throat level, the zero throat level lying in a plane substantially parallel to the air bearing surface and substantially normal to the first pole layer;

a second pole layer formed over, and separated from the pedestal for defining a write gap therebetween;

a top yoke partially covering, and stitched to the second pole layer;

wherein the second pole layer includes a sloped rearward edge; and wherein the top yoke is stitched at least in part along the sloped rearward edge;

wherein the suspension includes a resilient load beam, and a flexure to which the slider is secured; and wherein the top yoke includes a forward most facet which is recessed relative to the air bearing surface.

13. A head gimbal assembly according to claim 12, wherein the write gap is filled with insulating material.

14. A head gimbal assembly according to claim 12, wherein the pedestal extends from the air bearing surface to the zero throat level.

15. A head gimbal assembly according to claim 12, further including a read section.

16. A head gimbal assembly according to claim 15, wherein the read section includes a first shield layer and a second shield layer; and wherein the pedestal extends integrally from a second shield layer.

17. A head gimbal assembly according to claim 12, further including a write coil of multi-layered conductive coil elements that are separated by an insulating layer.

18. A head gimbal assembly according to claim 17, wherein the read section includes any of: a magnetoresistive (MR) element, a giant magnetoresistive (GMR) element, a spin valve, or a Current In the Plane mode (CIP) sensor.

19. The head gimbal assembly according to claim 17, wherein the insulating layer is separated from the sloped rearward edge by a clearance.

20. A head gimbal assembly according to claim 12, wherein the pedestal and the second pole layer have substantially the same width, as viewed from the air bearing surface.

21. A thin film according to claim 20, wherein the width of the pedestal and the second pole layer defines a track width of a medium.

22. The head gimbal assembly according to claim 12, wherein the sloped rearward edge begins to slope at substantially the plane of the zero throat level.

23. A thin film head including a write section and defining an air bearing surface, the head, comprising:

a first pole layer;

a pedestal having a back edge that defines a zero throat level, the zero throat level lying in a plane substantially parallel to the air bearing surface and substantially normal to the first pole layer;

a second pole layer formed over, and separated from the pedestal for defining a write gap therebetween;

a top yoke covering at least in part, and stitched to the second pole layer;

wherein the second pole layer includes a sloped rearward edge;

wherein the top yoke is stitched at least in part along the sloped rearward edge; and wherein the pedestal and the second pole layer have substantially the same width, as viewed from the air bearing surface.

24. A thin film head according to claim 23, wherein the pedestal extends from the air bearing surface to the zero throat level.

25. A thin film head according to claims 23, further including a read section that includes a first shield layer and a second shield layer; and wherein the pedestal extends integrally from a second shield layer.

26. A thin film head according to claim 25, wherein the read section includes any of: a magnetoresistive (MR) element, a giant magnetoresistive (GMR) element, a spin valve, or a Current In the, Plane mode (CIP) sensor.

27. A thin film head according to claim 23, further including a write coil formed of multi-layered conductive coil elements that are separated by an insulating layer.

28. The thin film head according to claim 27, wherein the insulating layer is separated from the sloped rearward edge by a clearance.

29. A thin film according to claim 23, wherein the width of the pedestal and the second pole layer defines a track width of a medium.

30. A thin film according to claim 29, wherein the top yoke includes a forward most facet which is recessed relative to the air bearing surface.

31. The thin film head according to claim 23, wherein the sloped rearward edge begins to slope at substantially the plane of the zero throat level.

32. A head gimbal assembly, comprising:

a suspension;

a slider;

a thin film head secured to the suspension, and defining an air bearing surface and a write section;

a first pole layer the write section including:

a pedestal having a back edge that defines a zero throat level, the zero throat level lying in a plane substantially parallel to the air bearing surface and substantially normal to the first pole layer;

a second pole layer formed over, and separated from the pedestal for defining a write gap therebetween;

a top yoke partially covering, and stitched to the second pole layer;

wherein the second pole layer includes a sloped rearward edge; and wherein the top yoke is stitched at least in part along the sloped rearward edge;

wherein the suspension includes a resilient load beam, and a flexure to which the slider is secured; and wherein the pedestal and the second pole layer have substantially the same width, as viewed from the air bearing surface.

33. A head gimbal assembly according to claim 32, wherein the pedestal extends from the air bearing surface to the zero throat level.

34. A head gimbal assembly according to claim 32, further including a read section that includes a first shield layer and a second shield layer; and wherein the pedestal extends integrally from a second shield layer.

35. A head gimbal assembly according to claim 32, further including a write coil formed of multi-layered conductive coil elements that are separated by an insulating layer.

36. A head gimbal assembly according to claim 35, wherein the read section includes any of: a magnetoresistive (MR) element, a giant magnetoresistive (GMR) element, a spin valve, or a Current In the Plane mode (CIP) sensor.

37. The head gimbal assembly according to claim 35, wherein the insulating layer is separated from the sloped rearward edge by a clearance.

38. A head gimbal assembly according to claim 32, wherein the width of the pedestal and the second pole layer defines a track width of a medium.

39. A head gimbal assembly according to claim 38, wherein the top yoke includes a forward most facet which is recessed relative to the air bearing surface.

40. The head gimbal assembly according to claim 32, wherein the sloped rearward edge begins to slope at substantially the plane of the zero throat level.

* * * * *